April 6, 1926.
A. W. SMITH
1,579,843
SELF CLOSING SISTER HOOK
Filed Jan. 2, 1925
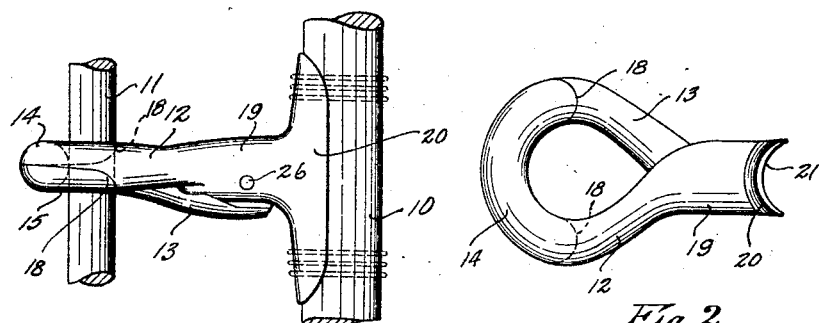
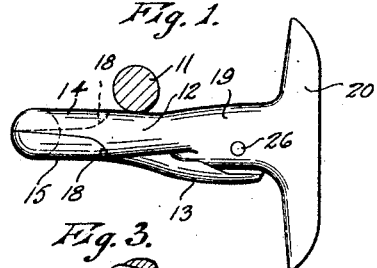
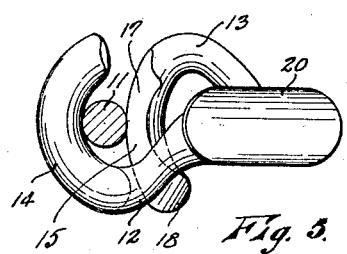
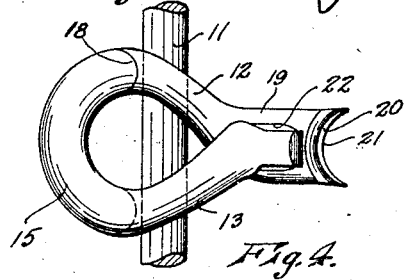
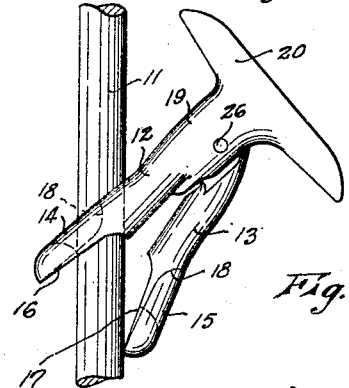
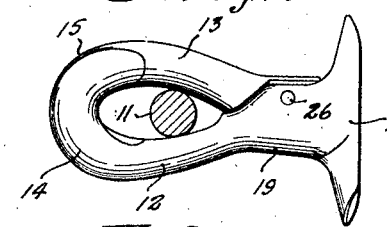
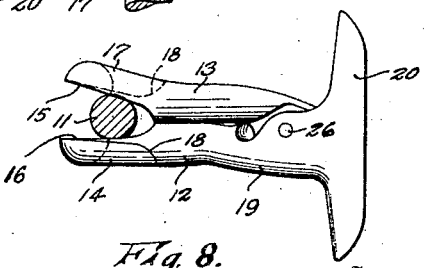
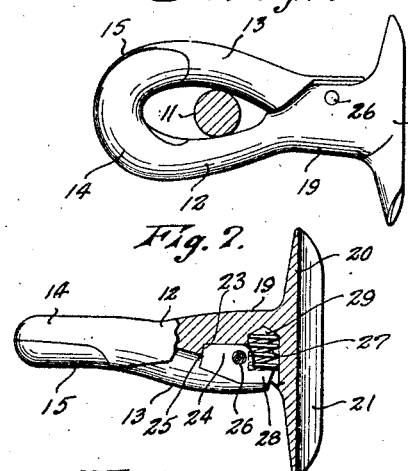
Inventor
Albert W. Smith
By Wooster & Davis
Attorneys Patented Apr. 6, 1926.

1,579,843

UNITED STATES PATENT OFFICE.

ALBERT W. SMITH, OF BRIDGEPORT, CONNECTICUT.

SELF-CLOSING SISTER HOOK.

Application filed January 2, 1925. Serial No. 51.

*To all whom it may concern:*

Be it known that I, ALBERT W. SMITH, a citizen of the United States, residing at Bridgeport, county of Fairfield, State of Connecticut, have invented a new and useful Self-Closing Sister Hook, of which the following is a specification.

This invention relates to a sister hook for use in the rigging of ships and attaching of sails, and has for an object to provide a device of this character which will have a greater strength than the ordinary snap hook, which will be so constructed that it will have no sharp corners or projections to chafe the canvas, and in which there is no chance of the device catching or fouling on stray lines or other objects.

It is also an object of the invention to provide a device of this character which will be self closing, which cannot be accidentally unhooked, in which the two parts are so connected that the connection will carry loads beyond the strength of the pivot pin that connects them, but in which the two elements to be connected may be easily and quickly lashed together or disconnected in the dark or any other time.

With the foregoing and other objects in view I have devised the construction illustrated in the accompanying drawing forming a part of this specification, similar reference characters being employed throughout the various figures to indicate corresponding elements. In this drawing, Fig. 1 is a side elevation of a hook in position and showing it connected to the parallel members.

Fig. 2 is a top plan view of the hook removed.

Fig. 3 is a side elevation of the hook showing the first position in the operation of connecting it to a stay.

Fig. 4 is a bottom plan view of the hook in this position looking toward the bottom of Fig. 3.

Fig. 5 shows the hook half way applied and twisted ninety degrees from the position of Fig. 4.

Fig. 6 is a side elevation of the hook in the position of Fig. 5 looking toward the bottom of this figure.

Fig. 7 is a top view of the hook showing the first position in the act of disconnecting the hook from the stay.

Fig. 8 is a similar view showing the hook twisted from the position of Fig. 7 and opened so that it may be removed laterally from the stay, and Fig. 9 is a partial side elevation and partial section of the hook closed.

In the drawing 10 represents a rope running along the edge of a sail to which the hook is attached and 11 represents a stay to which the sail is to be secured by means of a series of these hooks secured at suitable intervals along the edge of the sail. The hook comprises two members 12 and 13, each provided with an open hook portion 14 and 15 respectively extending in opposite directions. These hook portions are the same in size and shape but are reversed and flattened on their opposed or inner sides as shown at 16 and 17 respectively. When closed these flat sides are together so that the hooks are in overlapping relation and the outer walls are convex so that when in this position they give a smooth, continuous outer surface void of bumps or projections as shown. The bodies of the hook portions are preferably tapered somewhat as shown with the thickest or strongest part adjacent the body of the two members 12 and 13, as this gives a greater strength at the connection between the hook portions where the strain is greatest. The outer or free ends of the hooks are rounded as shown at 18 to fit into the curve at the inner end of the flattened portion of the hook to carry out the idea of the smooth continuous outer surface.

The upper member 12 has a shank 19 connecting the hook portion 14 with a hank or base 20. This hank or base may be of different shapes, but is preferably oblong with a concave rear surface 21 extending longitudinally thereof to receive the rope 10, and to which the base may be lashed by any suitable means. The shank 19 is provided with a recess 22 opening inwardly from its lower side and this recess is provided with a shoulder 23 on the side toward the hook portion 14. The lower member 13 is provided with a laterally extending lug 24 projecting into the recess, and this lug has a shoulder 25 on the side nearest the hook portion so that when the hook is closed this shoulder will engage the shoulder 23. The two members are pivoted together by a pin 26 extending through the shank 19 and the lug 24, and the engagement of the two shoulders 23 and 25 will take a large part of the strain on the hook off the pivot pin 26, so that in reality the device will carry loads beyond the strength of the pivot pin used to connect the two members together. A coil spring 27 is seated in the recess in the shank 19 and bears at its opposite ends against the bottom of the recess and an overhanging projection 28 on the member 14, so that this spring tends to hold the elements together while in closed position as shown in Figs. 1, 2, 3, 4, 7 and 9. I prefer to form a small socket 29 in the bottom of the recess 22 to help retain this spring in position.

It will be apparent from this construction that there are no projections on this hook to chafe the canvas or to catch on any stray lines or other objects to accidentally open the hook or to prevent proper manipulation of the sail. The hook is so mounted on the sail that the movable member 15 is on the under side of the other member 12, as shown in Fig. 1. Thus the recess 22 is open at its lower side so that there will be no pocket which may catch and hold water to cause trouble by freezing, and as any water may easily drain out corrosion is greatly reduced. This pocket may, however, be filled with grease or suitable lubricant which will protect the parts in the pocket, and will also insure proper operation. This pocket is so shaped and located that no core is required in casting. It thus greatly simplifies the process of manufacturing and reduces its cost. It also allows the use of a coil or helical spring which is much less likely to fail and which may be made of non-corroding material.

This means of connecting the two elements together and this method of placing them with the movable member at the bottom or lower side, serves as a guide to indicate the opening side of the hook, that is, if the hook is properly mounted the operator will know that the lower side is always the opening side, and in handling the hook when disconnected from the stay 11 the proper arrangement of the hook will be easily indicated. The operation of applying or removing the hook from a stay, indicated at 11, is a simple one. It may be easily and quickly performed even in the dark as this construction and method of mounting indicates to the operator which is the lower or opening side. For instance, in applying the hook, one side is placed against the stay as shown in Figs. 3 and 4 with the body portion of the member 13 at the bottom. By now pressing this member against the stay the hook will be opened somewhat and by twisting the upper end of the base 20 toward the operator and moving it upwardly to the inclined position shown in Figs. 5 and 6 the stay 11 will lie between the two hook portions as shown in these figures, and by continuing this turning or twisting operation the stay will be brought into the opening or eye through the hook members, and the hook will then be closed under the action of the spring. This operation is a simple one which may be quickly and easily performed. In disconnecting the hook from the stay 11 it is twisted slightly from the position shown in Fig. 1 by moving the upper end of the base toward the operator to the position shown in Fig. 7. By continuing this twisting movement the cramping action of the stay between the two body portions of the hook members will open the hook as shown in Fig. 8, and the hook may be withdrawn from the stay by moving it to the right as viewed in this figure. This is also a very simple operation easily and quickly performed.

It will be apparent from the foregoing description that this double hook has a greater strength than the ordinary snap hook, that it is very simple both in construction and operation, requiring no tools or lashings to make it secure. The devices now commonly in use frequently cause trouble by catching on or even becoming attached to stray lines or fouling or various deck objects. In the present hook it will be obvious there is nothing to catch or foul any of these objects, nor is there any possibility of it becoming accidentally attached to any stray lines. Furthermore, there are no sharp points or projections to chafe the canvas when it is folded. When under load there is no tendency to open the hook as the strain tends to hold it closed. It, therefore, cannot become accidentally detached as it is operative only when the strain on the hook is released.

Having thus set forth the nature of my invention, what I claim is:

1. In a device of the character described, a pair of oppositely directed similar open hooks pivoted together so as to move laterally toward and from each other in a direction substantially normal to the planes of the hooks, said hooks being flattened on their opposed sides and arranged when closed with the flattened sides together, the outer surfaces forming a continuous surface void of projections, and a spring tending to hold the hooks together.

2. In a device of the character described, a pair of oppositely directed open hooks pivoted together so as to move laterally in a direction substantially normal to the planes of the hooks, each hook being flattened on the side toward the other hook and convex on the opposite side so that when the hooks are together they will form an element having a substantially smooth continuous outer surface, a spring tending to hold the hooks together, and a shank integral with one of the hooks and extending substantially at right angles to the plane of the hook.

3. In a device of the character described, a pair of oppositely directed open hooks pivoted together so as to move laterally toward and from each other, one of the said hooks having a shank provided with a recess having a shoulder on the side thereof nearest the hook, the other hook having a shank extending into the recess and provided with a shoulder to engage the first shoulder, and a spring tending to hold the members together.

4. In a device of the character described, a pair of oppositely directed open hooks pivoted together so as to move laterally toward and from each other, said hooks being flattened on their opposed sides and when closed arranged with the flattened sides together and the outer surfaces forming a continuous smooth surface void of bumps or projections, a base connected to one of the hooks by a shank provided with a recess open at one side of the shank, the other hook being provided with a laterally projected lug in said recess, a pivot pin through the shank and lug, and a spring in the recess tending to hold the hooks closed or together.

5. In a device of the character described, a pair of oppositely directed open hooks pivoted together so as to move laterally toward and from each other, said hooks being flattened on their opposed sides and when closed arranged with the flattened sides together and the outer surfaces forming a continuous smooth surface void of bumps or projections, a base connected to one of the hooks by a shank provided with a recess open at one side of the shank, the side of the recess nearest the hook forming a shoulder, the other hook being provided with a laterally projecting lug in said recess having a shoulder engaging the first shoulder, a pivot pin through the shank and lug, said latter hook having a projection on the opposite side of the pivot from the shoulder, and a coiled spring seated in the recess and reacting against said projection to hold the hooks together.

6. In a device of the character described, a pair of oppositely directed open hooks pivoted together so as to move laterally toward and from each other, said hooks having shanks and being flattened on their opposed sides, the remaining portion of the hook being tapered with the thickest part on the end nearest the shank, said hooks when closed being arranged with the flattened sides together and the outer surfaces forming a continuous surface void of projections, and a spring tending to hold the hooks together.

In testimony whereof I affix my signature.

ALBERT W. SMITH.